United States Patent [19]
Troyk et al.

[11] Patent Number: 5,697,076
[45] Date of Patent: Dec. 9, 1997

[54] SUSPENDED CARRIER MODULATION OF HIGH-Q TRANSMITTERS

[75] Inventors: Philip R. Troyk, Morton Grove, Ill.; William Heetderks, Silver Spring, Md.; Martin Schwan, Chicago, Ill.; Gerald Loeb, Northridge, Calif.

[73] Assignees: Illinois Institute of Technology, Chicago, Ill.; United States of America as represented by the Department of Health and Human Services, Washington, D.C.

[21] Appl. No.: 432,605

[22] Filed: May 1, 1995

[51] Int. Cl.$^6$ .............................. H01Q 11/12; H04B 1/04
[52] U.S. Cl. .......................... 455/127; 455/89; 455/116; 363/97
[58] Field of Search .............................. 455/127, 129, 455/89, 116, 121, 123, 124, 67, 42, 44; 363/97, 169, 21

[56] References Cited

U.S. PATENT DOCUMENTS

| | | | |
|---|---|---|---|
| 4,535,399 | 8/1985 | Szepesi | 363/97 |
| 4,607,323 | 8/1986 | Sokal | 363/97 |
| 4,891,746 | 1/1990 | Bowman et al. | 363/131 |
| 5,010,261 | 4/1991 | Steigerwald | 307/571 |
| 5,179,511 | 1/1993 | Troyk et al. | 363/91 |
| 5,396,410 | 3/1995 | Okochi et al. | 363/21 |

*Primary Examiner*—Reinhard J. Eisenzopf
*Assistant Examiner*—Darnell R. Armstrong
*Attorney, Agent, or Firm*—Speckman, Pauley & Fejer

[57] ABSTRACT

A method for on-off modulation of a transmitter coil current of a high-Q resonant circuit transmitter comprising the steps of sensing a zero-crossing of the transmitter coil current and substantially instantaneously interrupting the transmitter coil current, and a high-Q resonant circuit transmitter for carrying out said method.

14 Claims, 2 Drawing Sheets

SUSPENDED CARRIER MODULATION OF HIGH-Q TRANSMITTERS

BACKGROUND OF THE INVENTION

1. Field of the Invention

This invention relates to a high-Q resonant circuit transmitter having means for on-off modulation of the transmitter coil current by which virtually no energy is lost during the current interruption such that, when the current is allowed to resume in the transmitter coil, its peak amplitude is not diminished. This permits the transition time between modulation states to be near zero. Such transmitters are suitable for use in a wide range of applications including data and power transmission for implantable micromodular devices for use in functional electrical stimulation for clinical application including reanimation of paralyzed limbs. Large numbers of these devices can be implanted and controlled by a single, external coil that transmits power and command signals by inductive coupling from a highly efficient power oscillator and modulator circuit in a wearable control box. The devices generally consist of a microcoil wound on a ferrite core, a custom IC chip, and a glass cylindrical capsule containing glass-to-metal feed through for electrodes at the ends.

2. Description of Prior Art

High-Q resonant circuits are often used as transmitters for inductively powered implanted electronic devices. However, high-Q circuits, by their nature, respond slowly to transients. By high-Q, we mean a resonant circuit transmitter having a Q greater than about twenty.

Several types of power converter topologies have been used in conjunction with high-Q resonant load networks for extracorporeal transmitters as part of implantable electronic systems. These include circuits based upon class A, class B, class C, and class E configurations. For most implantable systems, it is desirable to minimize power consumption by the transmitter circuitry. Therefore, high-Q resonant load networks are preferred, due to their inherently low real power consumption. This low power is a direct result of the low equivalent series resistance characteristic of a high-Q network.

Unfortunately, the use of a high-Q network, while enhancing power transfer from the transmitter to the implanted device also severely limits the bandwidth for data transfer to the implanted device. The data transfer is often accomplished by modulation of the transmitter carrier. The high-Q network limits the rate at which the peak amplitude of the transmitter carrier can be changed.

Class E resonant power converters offer high efficiency and consequently, in operation, Class E resonant power converters are characterized by low power dissipation, low junction temperature and high reliability. However, despite its extremely high-efficiency, Class E-type power converters are difficult to regulate and control. Class E power converters must be operated in a "lossless region". Otherwise, large amounts of power are dissipated in the transistor switching devices of the power converter, resulting in damage to these components. To maintain operation in the "lossless region", substantially zero voltage and zero slope conditions must be maintained at the switch-on times for the power switching device. One such Class E resonant power converter is taught by U.S. Pat. No. 5,179,511.

The '511 patent teaches a Class E resonant power converter comprising controllable switching means having non-conducting and conducting states, and drive means providing drive signals for causing the switching means to switch between its non-conducting and conducting states to supply direct current power to a load through a high-Q resonant load network. Sensing means for sensing load current and control means responsive to the sensing means for controlling the drive means to provide switching of the switching means between non-conducting and conducting states only when the amplitude of the voltage across the switching means is minimal and the slope of the voltage waveform for the voltage is substantially zero are also provided. In this manner, power converter operation is maintained in a minimal loss region.

SUMMARY OF THE INVENTION

It is an object of this invention to provide a high-Q resonant circuit transmitter, the current of which is subject to instantaneous interruption with zero or substantially zero loss of energy from the circuit.

It is another object of this invention to provide a high-Q resonant circuit transmitter, the current of which can be turned on for a time as short as one carrier cycle, and turned off, that is suspended, for any time desired, including fractions of cycles.

It is another object of this invention to provide high-Q resonant circuit transmitters suitable for use with implanted devices which function as sensors, whereby the outgoing telemetry or data collection can be accomplished without interference from the transmitter.

It is yet another object of this invention to provide a high-Q resonant circuit transmitter in which the data rate for transmission of commands, in the form of on-off transmitter pulses, can approach the transmitter frequency while lowering the frequency of the transmitter to increase its efficiency. Using known modulation techniques, lowering of the frequency of the transmitter results in lowering of the data rate transmission. Accordingly, it is an object of this invention to provide a high-Q resonant circuit transmitter capable of operating at lower transmitter frequencies while maintaining data rate recovery at levels corresponding to higher transmitter frequencies.

These and other objects are achieved by a high-Q resonant circuit transmitter in accordance with this invention comprising control means for on-off modulation of the transmitter coil current whereby the transmitter coil current is substantially instantaneously interrupted at a zero-crossing of the transmitter coil current.

Further, in accordance with this invention, storage means for storage of the energy of the resonant circuit during the interruption of the transmitter coil current are provided. In this manner, all of the energy in the circuit is stored during the current interruption and resumption of oscillation with little or no transient behavior is possible.

Still further in accordance with this invention, switching means having conducting and non-conducting states are provided, which switching means are controlled by said control means to switch between the conducting state and non-conducting state in synchronization with the zero-crossings of the transmitter coil current.

Accordingly, a method for on-off modulation of a transmitter coil current of a high-Q resonant circuit transmitter in accordance with this invention comprises the steps of sensing a zero-crossing of the transmitter coil current and substantially instantaneously interrupting the transmitter coil current at said zero-crossing. The transition time between on-off modulation states in accordance with the method of this invention approaches zero. In addition, operation of the high-Q resonant circuit transmitter during the "on" period is independent of operation during the "off" period.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
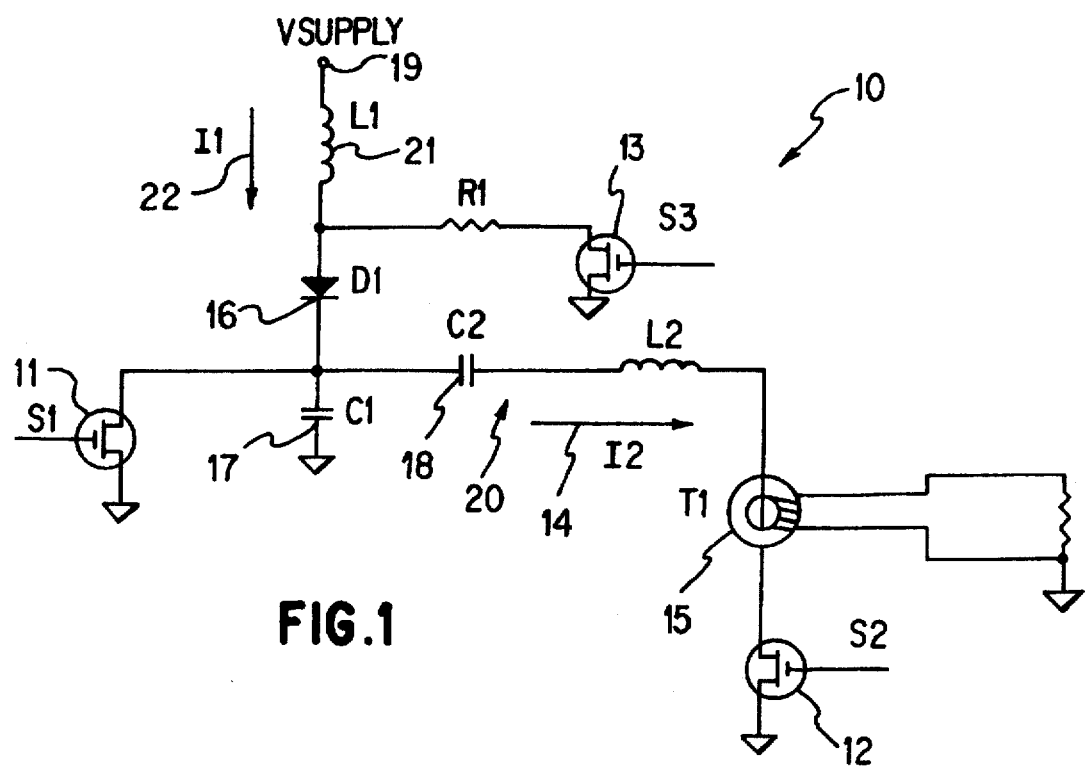
FIG. 1 is a schematic diagram of the Class E portion of a high-Q resonant circuit transmitter in accordance with one embodiment of this invention.

The high-Q resonant circuit transmitter of this invention employs a technique for on-off modulation of the transmitter coil current in which the coil current is interrupted at the instant that all the energy of the resonant circuit is stored as voltage on the series capacitor. Through this technique, virtually no energy is lost and, thus, when current is allowed to resume in the transmitter coil, its peak amplitude is not diminished. This permits the transition time between modulation states to be near zero. In accordance with the method of this invention, the transition between on and off states is synchronized to the zero-crossing of the coil current. This requires that the transmitter be on for an integer number of cycles. However, the transition from off to on can occur at any time, thus enabling many modulation schemes. The number of cycles on can be varied, the off time can be varied, or a combination of both can be used to transmit the data. Typically, one to four cycles on and off is used.

In a transmitter with only power and data transmission requirements, circuit design and operation is quite simple. Class E transmitters using the modulation technique of this invention have choke currents less than the steady-state choke currents that would flow if modulation was not present. This is due to the fact that the supply current will be lower due to the duty cycle effect of the on-off modulation. This lower supply current, in turn, results in a lower coil current. For transmitters with large choke inductances, that is more than twenty times the transmitter coil inductance, the choke current amplitude will be a function of the average duty cycle of the modulation. For short off times, 1–4 cycles, a large choke insures that the choke current does not significantly decrease during the off periods. Maintaining energy levels in all the energy storing components of the circuit of this invention is essential to successful application of the on-off modulation technique of the method of this invention.

Using this modulation technique, the transmitter can be switched off for extended periods of time. This is extremely useful, for example, where data required to be received from an implant uses the same frequency as the transmitter. As long as all the initial conditions are maintained, or restored, operation of the circuit during the on period of time will be independent of the off period of time. As a result, there will be no restart transient in the coil current, even after a very long period of time.

The choke cannot maintain constant current during very long off periods of time, nor is it advantageous to do so. During long off times, choke current is an unnecessary waste of supply power. By sizing the choke such that choke current decays to zero in a period of time which is several times shorter than the longest off period of time, the current can go to zero during the long off times. A diode is needed in series with the choke, in this case, so that the choke current cannot become negative. A negative choke current would result in voltage being drained from the parallel capacitor. This would mean that the initial conditions of the circuit would be incorrect at the restart time and would result in a restart transient. Accordingly, it is essential that the choke current be returned to its initial value prior to the restart of the transmitter. This is accomplished by switching in a properly chosen resistor from the circuit side of the choke to ground prior to restart. The current in the choke will follow an R-L type exponential rise to its correct initial value.

Figure 2:
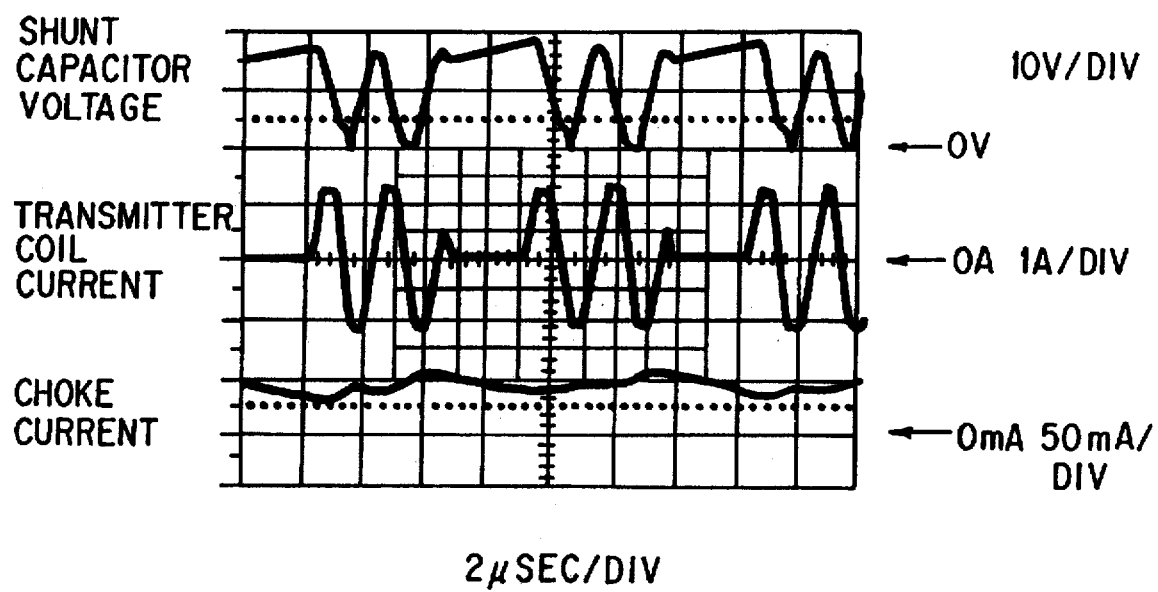
FIG. 2 shows circuit operation waveforms for voltage on the parallel capacitor, C1, of the circuits shown in FIG. 1 for "short" interruption periods.

FIG. 1 shows the Class E portion of the high-Q resonant circuit transmitter 10 of the invention claimed by us. Short-off modulation, that is 1 to 3 cycles, circuit operation is described as follows. Initially, series switch 12 is closed and parallel switches 11 and 13 are open. The Class E circuit is operating closed loop. The series branch current 14 is sensed through current transformer 15, the signal of which is used by the control portion of circuit 10 to drive the switches 11, 12 and 13. In synchronization with the positive-going, zero-crossing of the series branch current 14, series switch 12 is open and subsequent parallel switch 11 drive is interrupted. As a result of this interruption, the voltage on parallel capacitor 17 swings up to two times Vsupply (in normal Class E operation), and remains there, that is in suspended-mode operation. Diode 16 is forward biased and very slowly charges parallel capacitor 17 due to the continued current in L2. This results in no DC current paths to ground for both capacitors 17 and 18, except for their own leakage resistances. The voltages on capacitors 17, 18 will, therefore, not significantly decay. At the zero-crossing of series branch current 14, series switch 12 is open and all the energy of the series branch 20 is stored on series capacitor 18 and the parallel capacitor 17 in the form of voltage. There is a small amount of current that must flow in series branch 20 after the zero-crossing to charge up the capacitance of series switch 12 (drain-to-source capacitance for FET switches). With a significantly large choke inductor 21, the current flowing from the supply 19 will not change significantly for "short" periods of time. As a result, all of the correct initial conditions exist in all of the energy storage elements of circuit 10 for resumed operation. When series switch 12 closes again, circuit 10 resumes normal operation without significant transients. The circuit can be held in the "suspended" mode for any length of time as long as the supply 19 does not drop significantly. FIG. 2 shows circuit operation waveforms for the voltage on parallel capacitor 17 and currents 14 and 22.

Figure 3:
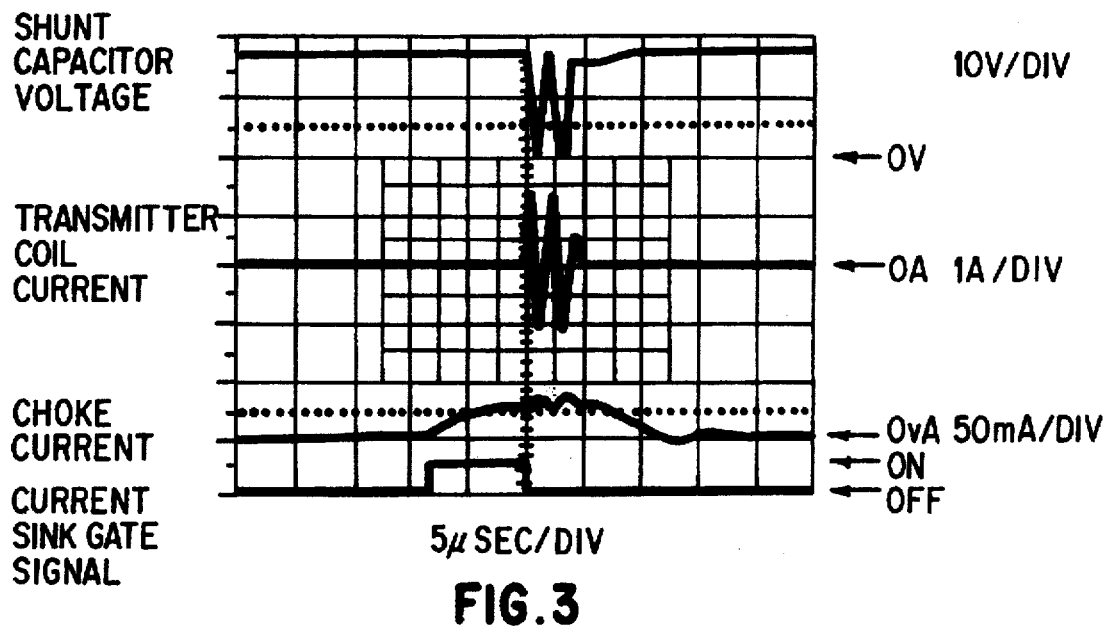
FIG. 3 shows circuit operation waveforms for the voltage on the parallel capacitor C1, currents I1 and I2, and drive signal for switch S3 for long "off" periods.
Figure 4:
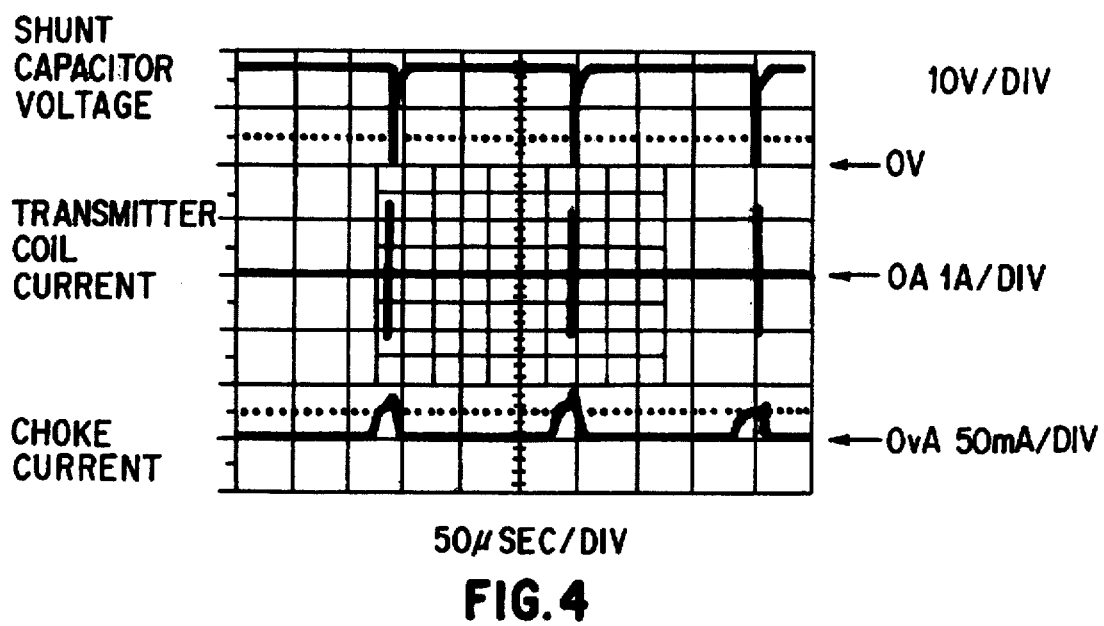
FIG. 4 shows circuit operation waveforms for the voltage on C1, the current I1 and I2, and the drive signal for switch S3 for long "off" periods in accordance with another embodiment of this invention.

For operation of the circuit 10 during "long" off periods, the current in choke inductor 21 decays to zero, causing diode 16 to become reverse biased. The voltages on parallel capacitor 17 and series capacitor 18 do not decay significantly for low loss capacitors. However, in order to avoid transients during restart of the circuit 10, the current 22 must be restored before restart. The operation of circuit 10 during a "long" off period is identical to the operation of circuit 10 during the "short" off operation described hereinabove except that switch 13 is closed prior to restart. When switch 13 is closed, current 22 rises to (Vsupply/R1) with an R1/L1 time constant. Thus, with the proper choice of R1, if switch 13 is closed long enough in advance of the closing of switch 12 (restart), the proper initial condition for current 22 can be achieved. When switch 12 is closed and Class E operation resumes, switch 13 opens, causing current 22 to flow into diode 16 instead of R1. FIGS. 3 and 4 show circuit operation waveforms for the voltage on parallel capacitor 17, currents 14 and 22, and the drive signal for switch 13.

Elimination of the R1-S3 branch may be possible with an appropriately sized choke inductor 21. In this case, the current 22 is allowed to go to zero, even for "short" off periods. When the circuit 10 is restarted, there will be a ramp up of the current in the circuit. To avoid transients, such ramp up can only be permitted for short periods of time, preferably one to four cycles.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a high-Q resonant circuit transmitter, the improvement comprising:

control means for on-off modulation of a transmitter coil current whereby said transmitter coil current is substantially instantaneously interrupted at a zero-crossing of said transmitter coil current; and switching means having conducting and non-conducting states, said control means causing said switching means to switch between said conducting state and said non-conducting state in synchronization with said zero-crossings of said transmitter coil current.

2. In a high-Q resonant circuit transmitter in accordance with claim 1 further comprising storage means for storage of the energy of said resonant circuit during said interruption of said transmitter coil current.

3. In a high-Q resonant circuit transmitter in accordance with claim 1, wherein said control means comprises zero-crossing detecting means for detecting the zero-crossing of said transmitter coil current.

4. In a high-Q resonant circuit transmitter in accordance with claim 2, wherein said storage means comprises at least one capacitor.

5. A method for on-off modulation of a transmitter coil current of a high-Q resonant circuit transmitter comprising:

sensing a zero-crossing of said transmitter coil current; and substantially instantaneously interrupting said transmitter coil current;

wherein operation of said high-Q resonant circuit transmitter during said on period is independent of operation during said off period.

6. A method in accordance with claim 5, wherein the energy of said resonant circuit is stored in at least one resonating capacitor.

7. A method in accordance with claim 5, wherein a transition time between said on and off modulation states is about zero.

8. A method in accordance with claim 5, wherein an on-off transition between said on and off modulation states is synchronized to a zero-crossing of said transmitter coil current.

9. A method in accordance with claim 8, wherein an off-on transition between said off and on modulation states can occur at any time.

10. A power and communication system for an implantable device for use in functional electrical stimulation comprising:

a high-Q resonant circuit transmitter; and control means for on-off modulation of a transmitter coil current whereby said transmitter coil current is substantially instantaneously interrupted at a zero-crossing of said transmitter coil current; and switching means having conducting and non-conducting states, said control means causing said switching means to switch between said conducting state and said non-conducting state in synchronization with said zero-crossings of said transmitter coil current.

11. A power and communication system in accordance with claim 10, further comprising storage means for storage of the energy of said resonant circuit during said interruption of said transmitter coil current.

12. A power and communication system in accordance with claim 10, wherein said control means comprises zero-crossing detecting means for detecting the zero-crossing of said transmitter coil current.

13. A power and communication system in accordance with claim 11, wherein said storage means comprises at least one capacitor.

14. A power and communication system in accordance with claim 10, wherein said high-Q resonant circuit transmitter comprises a closed-loop Class-E transmitter circuit.

* * * * *